United States Patent [19]

Randolph et al.

[11] 4,025,034
[45] May 24, 1977

[54] FLUX BACKUP ARRANGEMENT FOR CIRCUMFERENTIAL WELDING

[75] Inventors: Robert W. Randolph, St. Charles; Steven L. Jantzen, St. Louis, both of Mo.

[73] Assignee: ACF Industries, Incorporated, New York, N.Y.

[22] Filed: May 6, 1976

[21] Appl. No.: 683,821

[52] U.S. Cl. .................................... 228/41; 228/48; 219/66

[51] Int. Cl.² .......................................... B23K 9/02

[58] Field of Search .................. 228/41, 48; 219/64, 219/66

[56] References Cited

UNITED STATES PATENTS

| | | | |
|---|---|---|---|
| 3,633,813 | 1/1972 | Looney | 228/41 |
| 3,643,853 | 2/1972 | Hiller | 228/41 |
| 3,734,387 | 5/1973 | Sannipoli | 228/48 |

Primary Examiner—James L. Jones, Jr.
Assistant Examiner—K. J. Ramsey

Attorney, Agent, or Firm—Henry W. Cummings

[57] ABSTRACT

A flux back-up assembly for a tank welding fixture is disclosed having a rotatable ring which supports a plurality of circumferentially spaced, radially extendible jacks for supporting and clamping hollow tank sections during welding of the sections in end-to-end abutting relation to form an elongated tank. The flux back-up assembly includes a continuous circular, flux receiving trough member formed of telescoping accurate sections attached to the extendible tank engaging ends of the jacks and adapted to telescope circumferentially whereby the continuous circular trough may expand or contract in diameter as the jacks are extended or retracted to accommodate tank sections of different diameters. A plurality of flux supply hoppers are carried by the ring at circumferential spaced points and are connected to the circular flux trough by conduits at points spaced from the hoppers whereby powdered flux from the hoppers is supplied to the trough member or returned to the hoppers by gravity as the ring is rotated during welding of the tank sections.

10 Claims, 10 Drawing Figures

FLUX BACKUP ARRANGEMENT FOR CIRCUMFERENTIAL WELDING

BACKGROUND OF THE INVENTION

In an article appearing in the April 1969 issue of Welding and Metal Fabrication, entitled New Equipment For Assembly of Tanks, equipment is described for internal circumferential welding of a pair of tank courses. This equipment includes a rotor having a pair of longitudinally spaced sizing rings mounted thereon. Courses to be circumferentially welded are moved on a longitudinal conveyor into position within the sizing rings. The sizing rings are hydraulically actuated and are located on each side of a circular copper backing bar. Hydraulic clamps move the courses into abutting engagement for internal circumferential tack welding. After internal tack welding, the sizing rings open wide enough to allow the tank courses to be rotated in the ring while continuous internal circumferential welding is carried out at the bottom of the ring. The copper bar is used as a backing during the continuous internal circumferential welding.

It has been found, however, that occasionally during internal circumferential welding, the weld will burn through the back-up bar and the back-up bar may become welded to the tank courses whereby an unsatisfactory weld may be obtained between the tank courses.

SUMMARY OF THE INVENTION

A flux back-up assembly is provided for use in internal circumferential welding of abutting hollow tank courses within a ring. A plurality of radially directed clamping jacks are mounted on the internal periphery of the ring. A circular flux trough including telescoping male and female trough members is mounted on the internal surface of the jacks which clamp adjacent tank courses together for welding. A plurality of enclosed hoppers are mounted about the periphery of the ring. The hoppers converge toward a bottom discharge opening and a conduit connects the bottom discharge opening of each hopper with the telescoping flux back-up through at a point spaced from the hopper. The ring and the hoppers are rotated while internal circumferential welding takes place at the bottom of the abutting courses. Powdered flux flows by gravity from the hoppers which are above the weld point through the conduit into the telescoping flux back-up trough to provide flux back-up and support behind the weld point. The flux has a high melting point and undesirable welding of the back-up assembly does not occur as may occur when a copper back-up bar is used. As the ring is rotated during welding the hoppers pass below the weld point and reach a point on the periphery of the ring below the weld point when flux flows from the flux back-up trough downwardly back through the conduit into the hoppers. This cycle is repeated to provide flux back-up during internal circumferential welding. When internal circumferential welding is not taking place, the flux in the hoppers may be replaced. The telescoping male and female trough members enable tanks having different diameters to be processed without changing the diameter of the ring before a tank having a different diameter than the previous tank is assembled. During the production of tanks in which the diameter of the joint between adjacent courses is different, such as slope bottom scalene cone tanks, a course having a different diameter than the previous course can be added to the tank section already assembled without changing the diameter of the ring.

DESCRIPTION OF PREFERRED EMBODIMENTS

Figure 1:
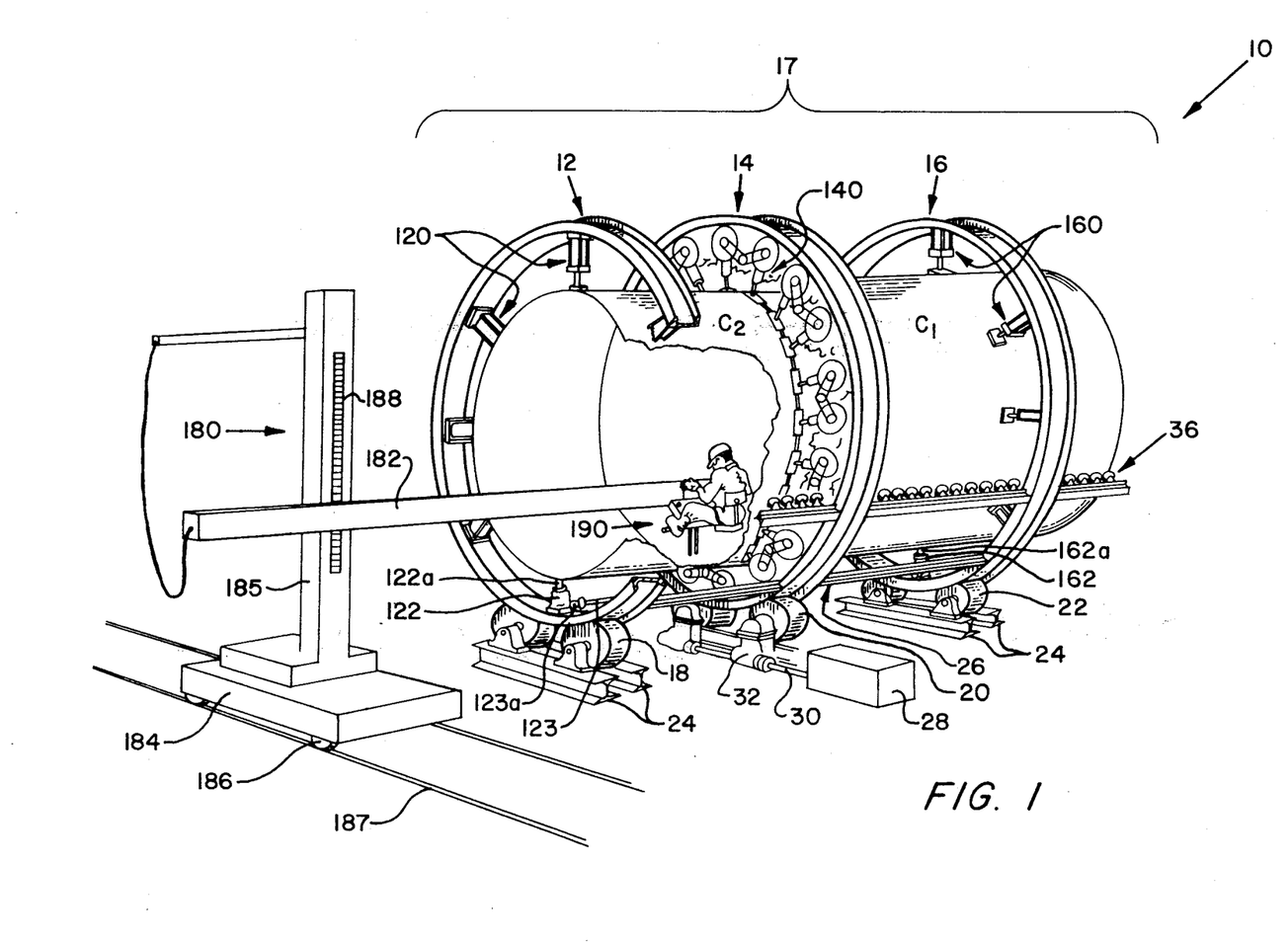
FIG. 1 is a schematic perspective view of a welding assembly which may be used with the flux back-up assembly of the present invention.
Figure 2:
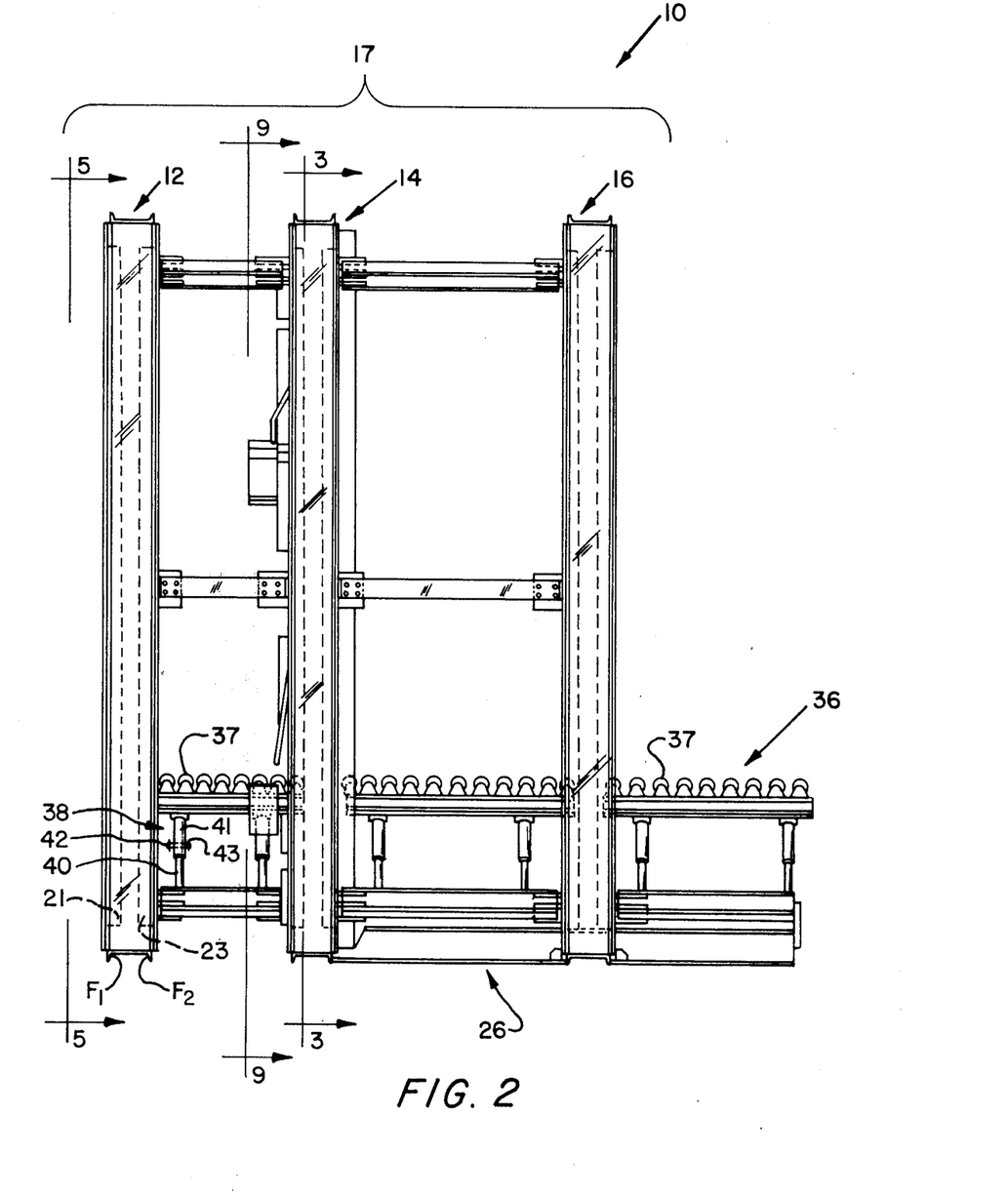
FIG. 2 is a side elevation view of the welding assembly shown in FIG. 1.
Figure 9:
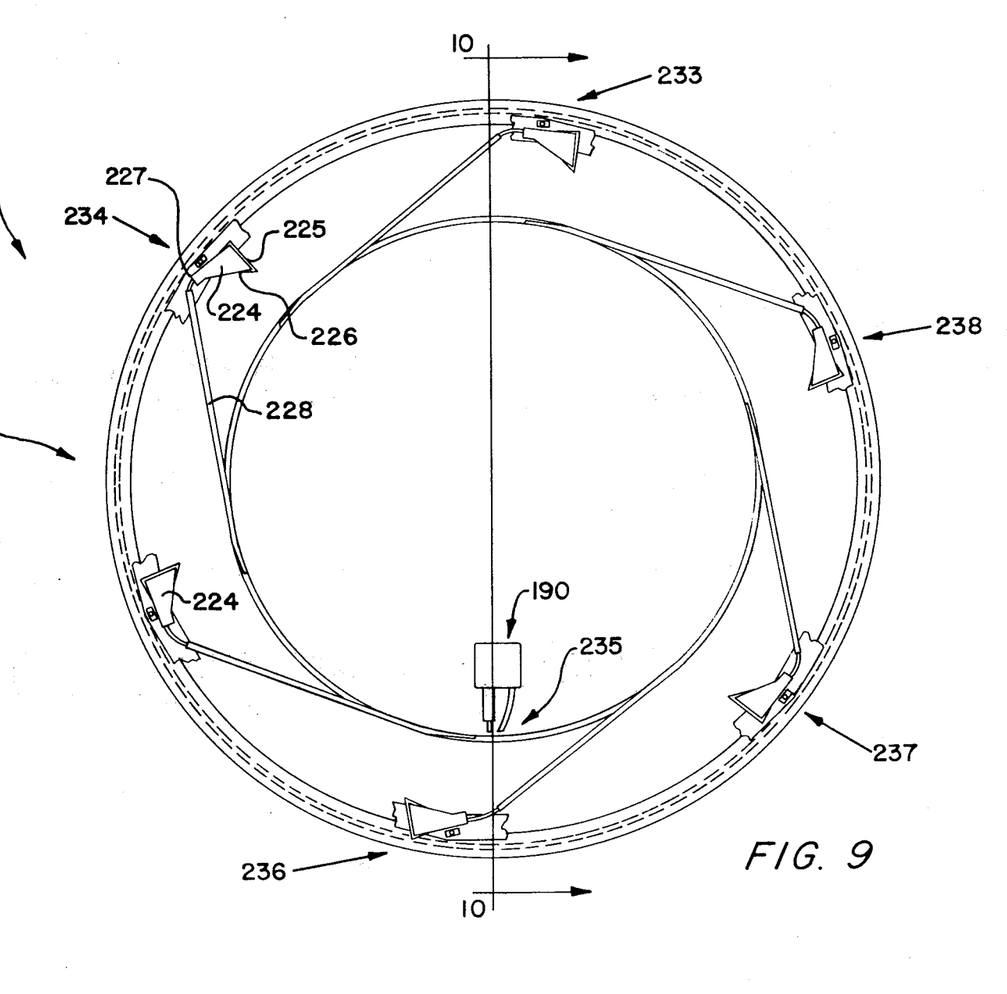
FIG. 9 is a sectional view looking in the direction of the arrows illustrating the flux back-up supply arrangement of the present invention.

The flux back-up assembly of the present invention may be used with a variety of installations for internally circumferentially welding together abutting tank courses. However, the flux back-up assembly is particularly adapted for use with the three ring cage welding assembly disclosed and claimed in application Ser. No. 683,662 filed May 6, 1976 assigned to the same assignee as the present application. As is described in greater detail in said application, this assembly can readily process both straight bottom and inclined bottom (scalene frusto-conical) tank courses. This assembly is indicated in FIG. 1 of the drawings generally at 10. The assembly includes three axially aligned, longitudinally spaced rings 12, 14 and 16 which define a welding cage 17. Each ring is supported on rollers shown respectively 18, 20 and 22. Each of the rollers have suitable I-beam supports 24. Each of the rings is of I-beam cross section as shown in FIGS. 2 and 9 and have flanges $F_1$ and $F_2$. A series of angles 19 (FIGS. 3 and 6) having legs 21 and 23 are mounted on the internal periphery of each ring, preferably by welding to the flanges $F_1$ and $F_2$ of the rings 12, 14 and 16 to provide inwardly directed flat surface 23 for mounting the hereinafter described jacks. The rings are suitably connected by a frame structure 26 (FIGS. 1 and 2) welded to the respective rings so as to enable the rings to rotate as a cage unit.

At least one set of rollers is driven by a variable speed drive including, for example, an electric motor or diesel engine mounted within a housing 28 having a drive shaft 30 extending therefrom and connected a suitable gear units 32 to drive rollers 20.

Figure 5:
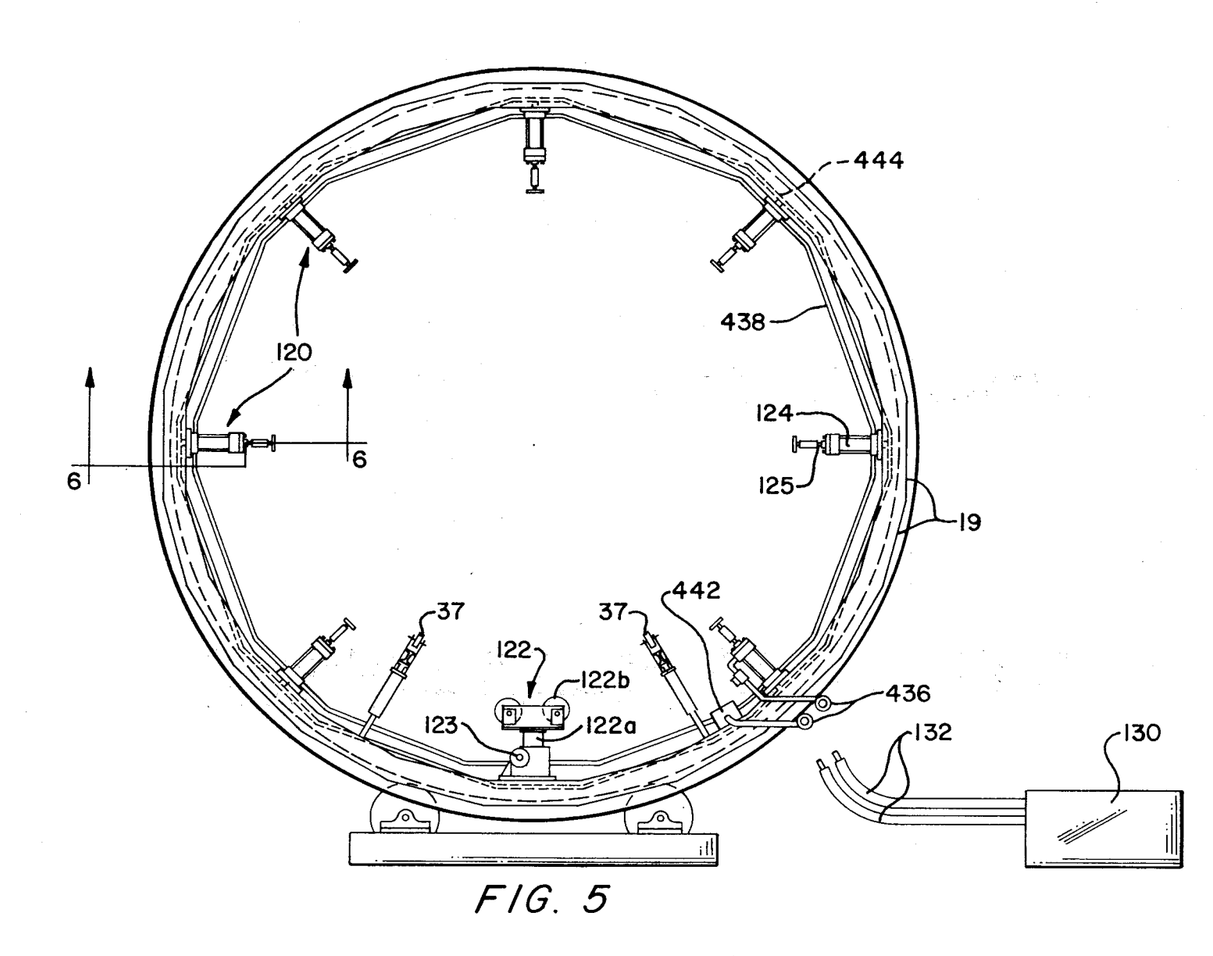
FIG. 5 is an end view looking in the direction of the arrows along the line 5—5 in FIG. 2.

A longitudinal roller conveyor 36 is provided for supporting tank courses within the three ring cage during loading and transfer. Conveyor 36 includes transversely spaced rollers 37 (FIGS. 2 and 5). Rollers 37 are provided with vertically adjustable support members 38. Supports 38 include a pair of telescoping members 40 and 41 each having a plurality of slots through which pins 42 may be inserted at desired levels. Cotter pins 43 may be provided to hold the pins in place.

Figure 3:
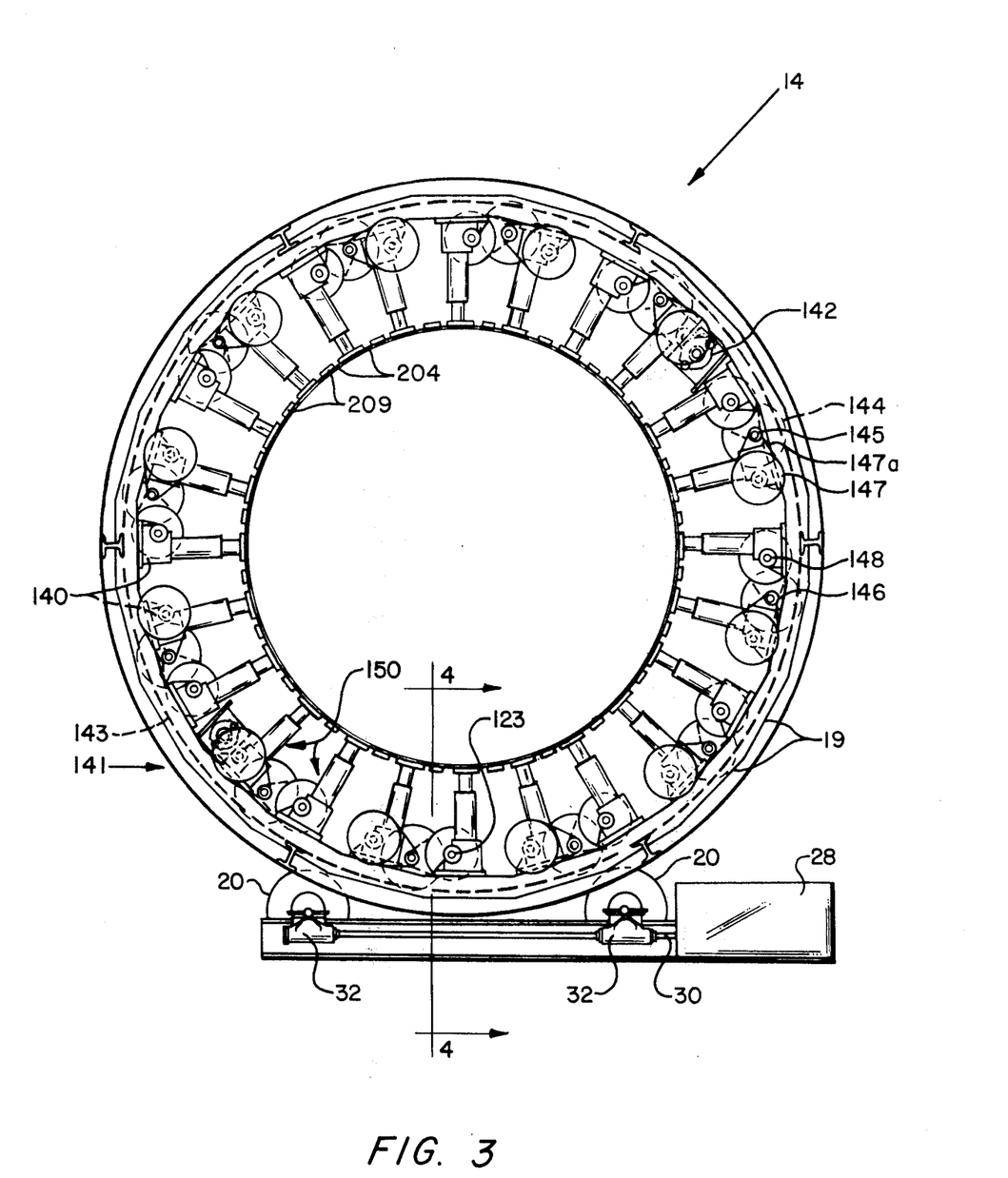
FIG. 3 is a view looking in the direction of the arrows along the line 3—3 in FIG. 2.

The center ring has a plurality of center jacks 140 which are circumferentially mounted on plates 19 (FIG. 3). Center jacks 140 are radially directed and each is extendible the same distance regardless of the resistance encountered by a particular center jack to force abutting edges of tank sections into a precise circular configuration, and support and hold the abutting edges in aligned relation during rotation and internal circumferential welding. Since center jacks 140 must move a specific distance regardless of the resistance encountered, this jack movement is more easily achieved with mechanical jacks. For this reason center jacks 140 are preferably mechanical. However, it is within the scope of the present invention for center jacks 140 to be hydraulic, and a control system provided to ensure that each jack moves inwardly the desired distance to form the desired circular diameter, regardless of the resistance that a particular hydraulic jack may encounter.

Side jacks 120 and 160 (FIGS. 1 and 5) are circumferentially spaced, radially directed seek and find jacks which automatically extend until all of the jacks exert the same force on the tank sections and thus clamp and hold the section for rotation while internal circumferential welding takes place at the abutting edges of the sections. This seek and find movement is more easily obtained with hydraulic jacks and thus side jacks 120 and 160 are preferably hydraulic. However, it is within the scope of the present invention to utilize mechanical jacks for side jacks 120 and/or 160 which are provided with a suitable control to obtain the seek and find movement for clamping.

Furthermore, the bottom jacks 122 and 162 in side rings 12 and 16 (FIG. 1) are preferably of the type that is movable a specified distance rather than the seek and find type to ajust the bottom of tank sections in the cage to precisely the same height for rotation during welding.

As described in greater detail in said Ser. No. 683,662 filed May 6, 1976 mechanical jacks 140 in center ring 14 are provided with a suitable drive indicated generally at 141 in FIG. 3. Drive 141 includes electric or hydraulic motors 142 which drive a circumferential chain 143. Chain 143 drives a plurality of sprockets 144 each having a shaft 145 which drives sprockets 146 generally at opposite ends thereof. A chain 147 from sprocket 146 drives a sprocket 147 having a shaft 148.

Figure 4:
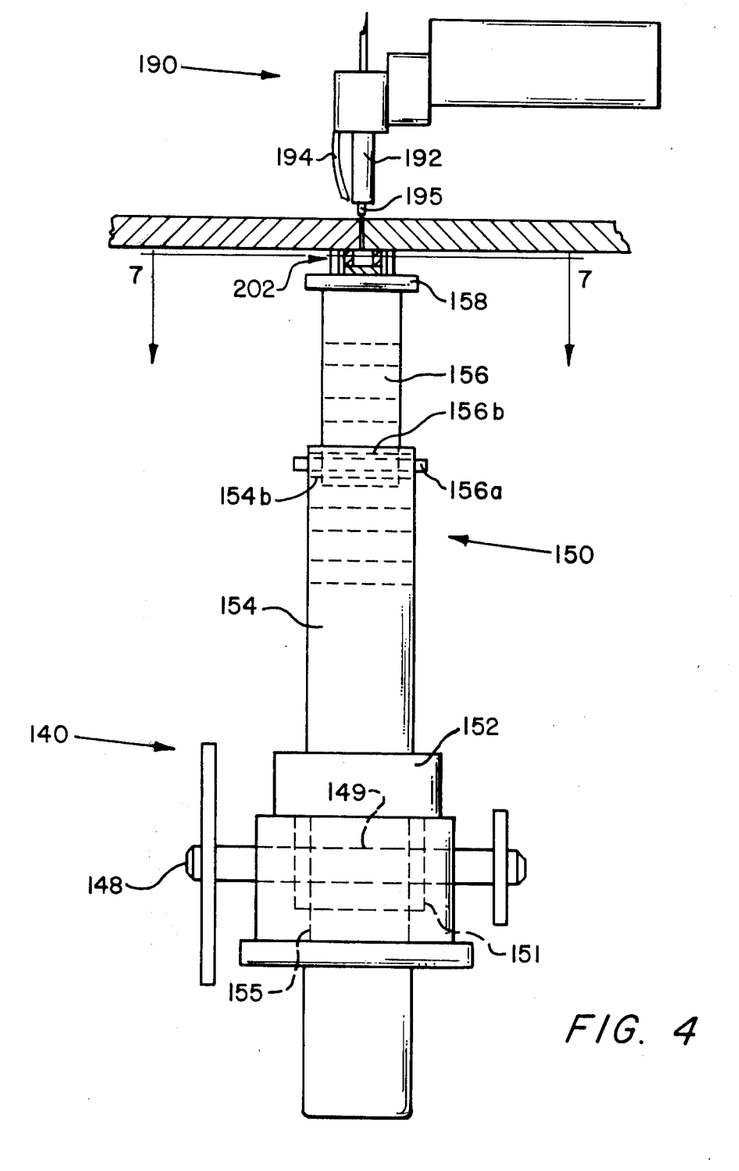
FIG. 4 is a view looking in the direction of the arrows along the line 4—4 in FIG. 3 illustrating the mechanical jack drive, ram assmbly and flux trough used in the apparatus of the present invention.

As shown in FIG. 4, the jacks 140 include a ram assembly 150. Ram assembly includes a body 152 having a ram movable therein 154. Shaft 148 drives a worm gear 149 which turns ring gear nut 151 which drivably engages threads 155 on ram 154. Ram 154 is connected to a sleeve 156 by means of a pin 156a. Pin 156a passes through slots 154b and 156b respectively in ram 154 and sleeve 156 to provide adjustment of the length of the jacks 140. Sleeve 156 is integral by means of fasteners or welding with a shoe 158.

Bottom jacks 122 and 162 in the side rings 12 and 16 (FIG. 1) are driven by a shaft 123 from a center jack 140. Bottom jacks 122 and 162 include respective rams 122a and 162a. A clutch 123a is provided to disengage shaft 123 from driving relation with jack 122. Rollers 122b are provided on rams 122a to support tank courses to be welded. Rollers (not shown) are also provided on rams 162.

Movement of chain 143 in FIG. 3 by motors 142 will cause rams 154 and shoes 158 of the jacks 140 in middle ring 14 to move inwardly toward a position engaging a tank course and rotation of chain 143 in the opposite direction will cause rams 154 and shoes 158 of jacks 140 to move outwardly in FIG. 4 away from a tank course. Simultaneously, jacks 122 and 162 in the bottom of side rings 12 and 16 will raise and lower rams 122a and 162a and the rollers mounted thereon to raise and lower tank courses supported on the rollers.

Figure 6:
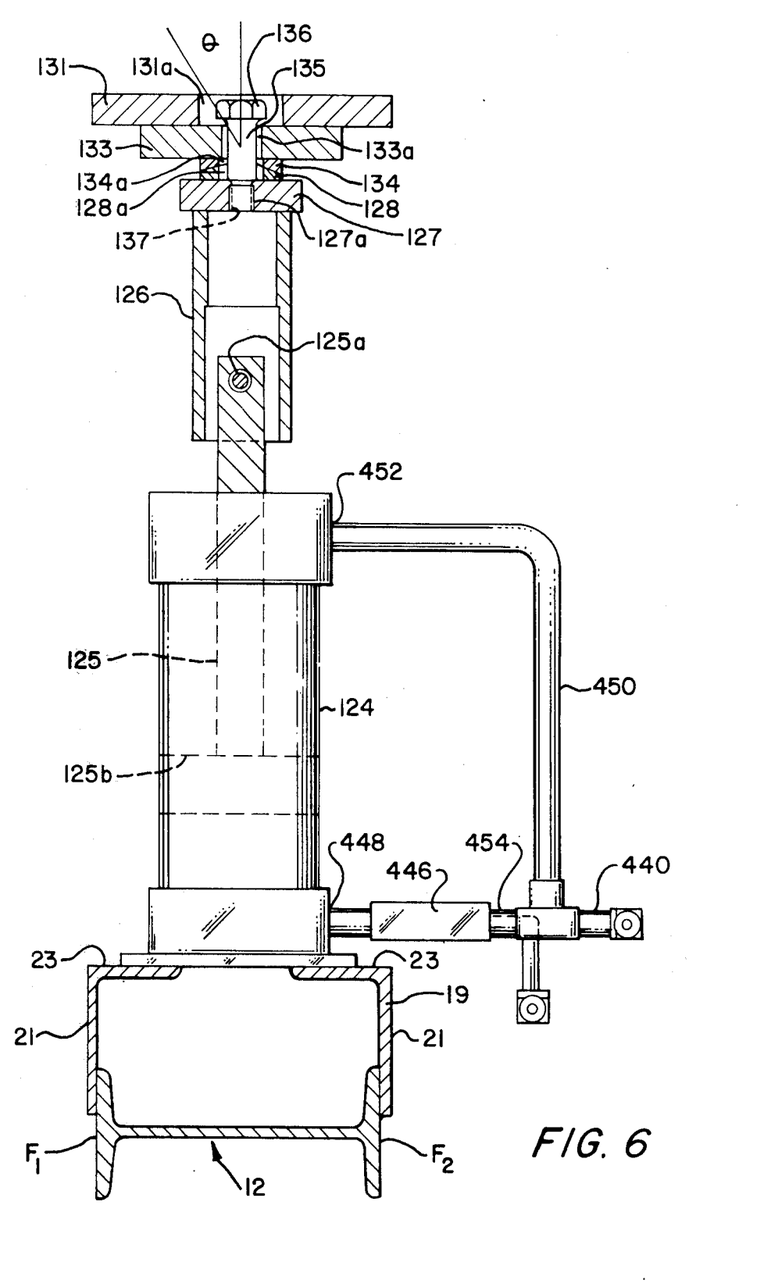
FIG. 6 is a sectional view looking in the direction of the arrows along the line 6—6 in FIG. 5.

The hydraulic jacks 120 and 160 in end rings 12 and 16 are structurally the same. As shown in FIG. 5, the jacks include hydraulic cylinders 124 having a piston 125 movable back and forth therein. Hydraulic fluid is supplied to the cylinders 124 from a pumping unit 130 through suitable conduits 132 which extend within the periphery of rings 12 and 16. As shown in FIG. 6, piston 125 is connected by means of pin 125a to an extension 126. Extension 126 has a plate mounted thereon 127 having a threaded opening therein 127a. A spherical member 128 is mounted integral with plate 127. A circular tank engagement plate 131 is provided having a support plate 133 having integral therewith a cooperating spherical surface 134 which slidably engages spherical surface 128. A fastening bolt 135 engages threaded opening 127a and maintains flexible engagement between the plate 127 and the tank engagement plate 131 to allow surface 134 to rotate relative to surface 128 to the extent of the diameter difference or spacing between the respective openings 128a, 134a, 133a and 131a.

The angle $\theta$ shown in FIG. 6 is defined between the neutral position of plate 133 and the rotated tank engaged position. This feature is particularly useful in assembly slope bottom tanks in which the tank engaging portion will rotate an angle $\theta$ clockwise in clamping in place tank courses to be welded after the courses have been clamped by the mechanical jacks 140 in center ring 14.

Hydraulic fluid is supplied to the cylinders from a pumping unit 130 through suitable conduits 132 which connect through quick connect couplings 436 to conduits 438 and 440 which extend within the periphery of rings 12 and 16. One conduit 438 directs fluid through at least one directional control valve 442 and then through another conduit 444, through a check valve 446, through inlet 448, and into cylinders 124 located around the internal periphery of the ring. Hydraulic fluid entering cylinders 124 through inlets 448 on the outboard side of the piston head 125b moves pistons 125 radially inwardly to engage a tank course to be clamped. The hydraulic fluid applies hydraulic pressure equally to each of the cylinders within the ring. Some pistons will move radially inwardly more than others, depending on the resistance to radial movement which each piston encounters as a tank course is engaged. Check valves 446 prevent fluid from flowing out of cylinders 124 through openings 448. The hydraulic pressure applied is sufficient for each piston to engage and clamp a portion of the course circumference. At a predetermined pressure, control valve 442 in each ring closes and the clamping pressure is maintained on the pistons clamping the tank courses in side rings 12 and 16. After each control valve 442 closes, conduit 132 is disconnected from quick connect couplings 436 on each side rings 12 and 16. Rings 12 and 16 may then be rotated with ring 14 while the tank courses are held in place for internal circumferential welding of their abutting edges in center ring 14.

To release the clamping pressure after the welding operation is completed and rotation of the rings has stopped, conduit 132 is again connected to couplings 436. A manual or automatic switch causes hydraulic fluid to flow from pumping unit 430 through a conduit 440 having a branch 450 to introduce hydraulic fluid into cylinders 124 through openings 452 on the opposite (inboard) side of piston head 125b. Conduit 440 also has a branch (not shown) which applies hydraulic pressure to check valves 446 to release the check valves and allow fluid to flow out through openings 448. Hydraulic fluid thus flows into cylinders 124 through openings 452, and out of cylinders 124 through openings 448, through check valves 446 and into conduit 438 toward pumping unit 130. During this time pistons 125 move away from the welded courses in side rings 12 and 16.

In accordance with the present invention a flux backup assembly indicated in the drawings generally at 200 is mounted upon ring 14. This assembly includes a flux back-up trough 202 mounted within shoe 158.

Figure 7:
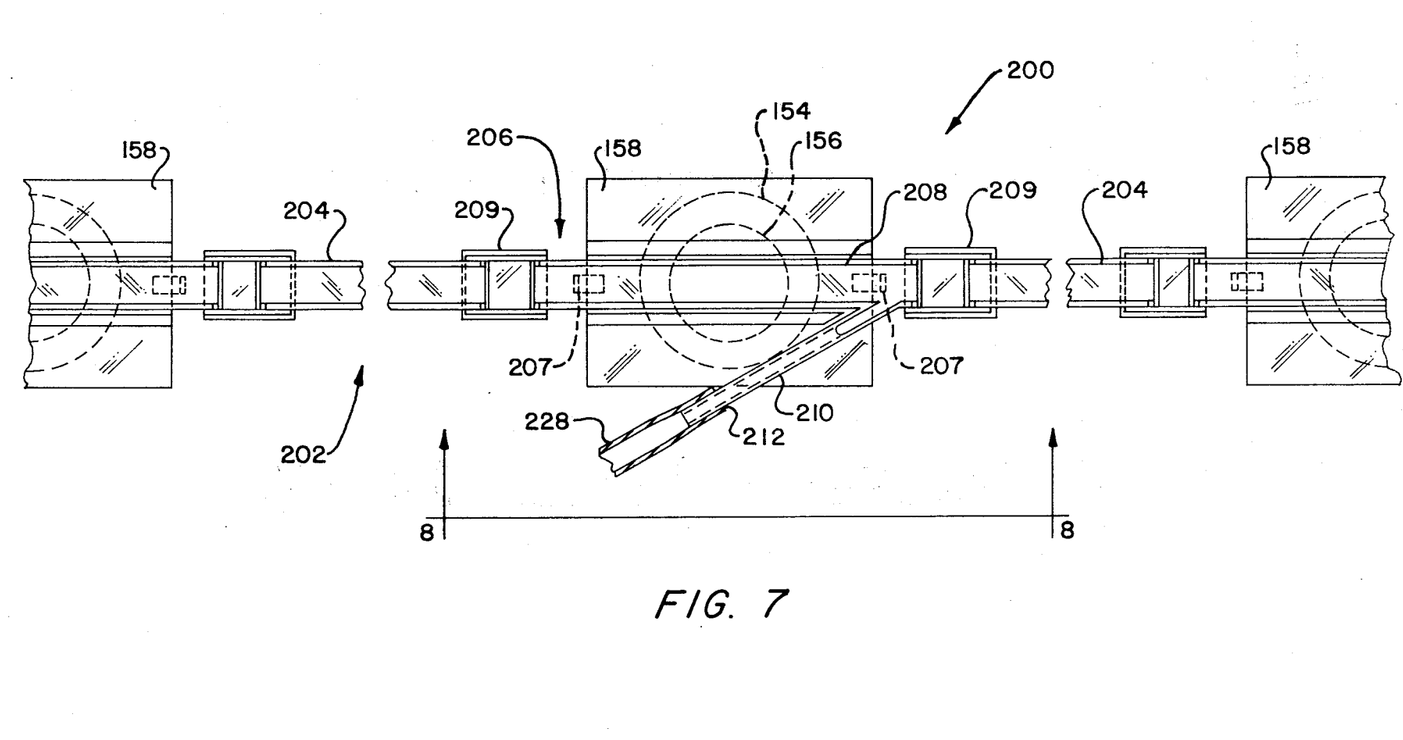
FIG. 7 is a plan view looking in the direction of the arrows along the line 7—7 in FIG. 4 illustrating the telescoping flux trough of the present invention.
Figure 8:
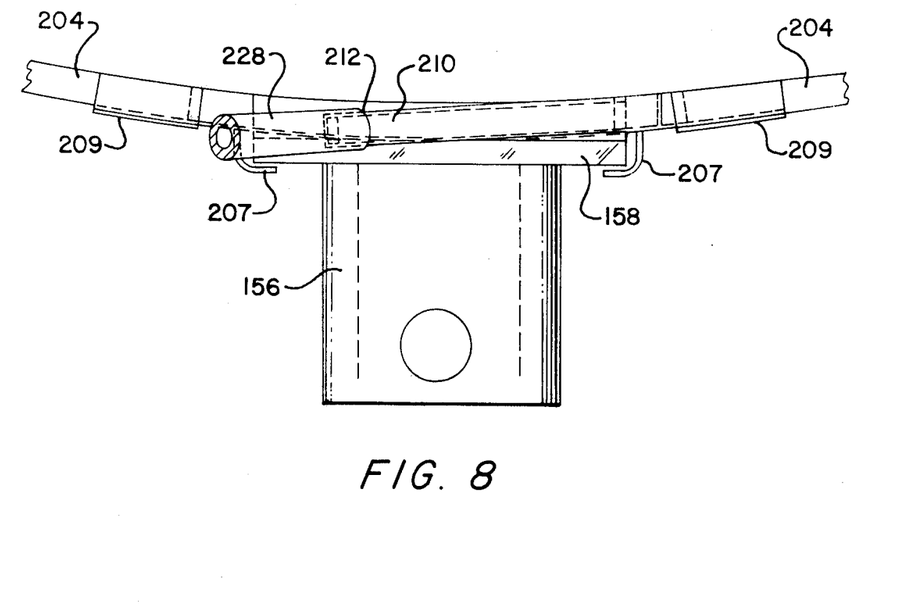
FIG. 8 is an enlarged view looking in the direction of the arrows along the line 8—8 in FIG. 7 illustrating the telescoping flux back-up trough of the present invention.

Flux back-up trough 202 extends within the internal periphery of shoes 158 inside ring 14 and includes male trough members 204 and female trough members 206 as shown in FIGS. 7 and 8. Female back-up members 206 are maintained in place on shoes 158 by clips 207 (FIG. 8). The female members include a main portion 208 which extends across shoes 158 and a pair of back-up joining portions 209 which may be welded to main portion 208. Male back-up members 204 telescope within back-up portions 209 to enable the back-up trough to adjust itself to different tank course diameters to be processed. Male members 204 extend between ram assemblies 150 (FIG. 3) and are supported by joining portions 209 of female members 206. When back-up members 204 are completely telescoped with portions 209 the radius of curvature of the back-up trough 202 corresponds to the diameter of the smallest tank section to be processed. Male members 204 and female members 206 when clamped flex to match the diameter of a tank section having a diameter larger than the smallest tank diameter which can be processed when the members are completely telescoped. In the completely extended position, the combined diameter of telescoping members 204 and 206 is greater than the diameter of the largest tank section to be processed. The range of tank diameters which can be processed at a given time may be varied by changing the position of pins 156a in rams 154 and sleeve 156.

Figure 10:
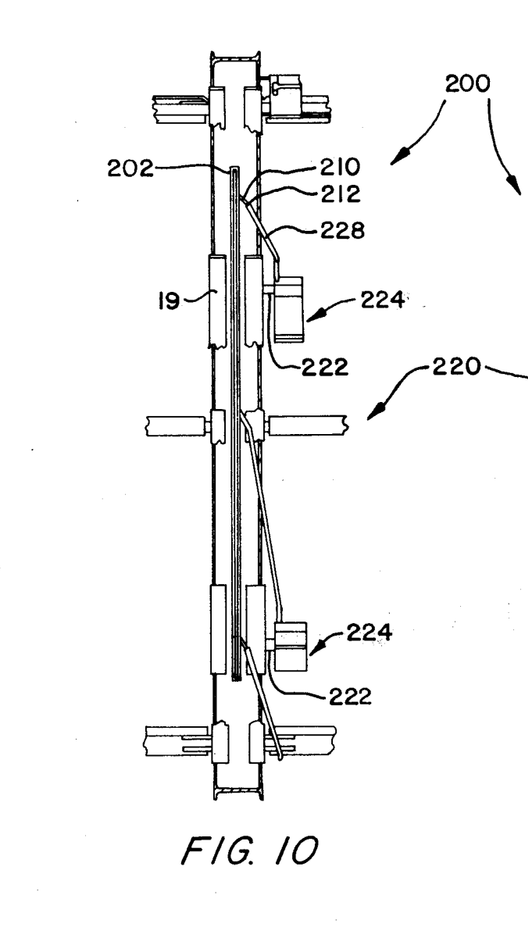
FIG. 10 is an end view looking in the direction of the arrows along the line 10—10 in FIG. 9 with the welding equipment removed.

Flux back-up assembly further includes apparatus 220 for providing a continuous supply of flux back-up into telescoping trough 202 during rotation of the cage illustrated in FIGS. 9 and 10. A plurality of flux hoppers or containers 224 are mounted about the internal periphery of center ring 14 on extensions 222 from angle 19. The hoppers 224 have a hinged cover 225 and walls 226 converge toward an outlet 227. A flexible hollow flux conduit 228 is affixed to the bottom of each hopper 224 with conventional fasteners (not shown). The opposite end of conduit 228 is connected to the outer end 212 of a hollow tubular extension 210 which is secured to the wall and communicates with the interior of trough 202.

At the position indicated by the reference numeral 234 in FIG. 9 the hopper is sufficiently vertical that flux begins to run out through the conduit 228 through tubular extension 210 into the trough 202 to provide a supply of flux to the flux trough 202. Flux continues to flow into trough 202 at position 234. A flux back-up is thus provided during the welding operation being carried out at the position indicated by the reference numberal 235. As is known to those skilled in the art, the flux has a high melting point and undesirable welding of the back-up assembly does not occur as may occur when a copper back-up is used. Some slag from the welding operation may gather in the flux trough. When hopper 224 reaches the position 236, flux flow in conduit 228 begins to occur in the other direction from trough 202 through tubular extension 210 into conduit 228 and into hopper 224. Hopper 224 thus begins to receive flux and slag from the welding operation at position 237. Flux and slag continue to flow from the flux trough 202 back into hopper 224. At position 238 virtually all of the flux and slag has flowed from trough 202 back into hopper 224 and at position 233 the flux and slag begins to flow back into trough 202. This cycle is repeated during the welding operation to maintain a supply of flux in back-up trough 202 at the weld point 235. Periodically during a period when the internal circumferential weld is not being formed, the spent flux and slag is removed from hopper 224 and new flux added.

Welding equipment is provided indicated generally at 180 in FIG. 1. This equipment is commercially available. It includes a welding boom 182 mounted on a movable welding support 184 having a vertical column 185. Welding support is rendered movable by means of wheels 186 riding on a track 187 which runs transverse to the welding assembly. The height of boom 182 may be adjusted on column 185 by projections (not shown) on the boom engaging vertically spaced slots 188 on the column 185. Rolls (not shown) are provided to move the welding boom 182 longitudinally within the course C2 including the operator and a welding assembly 190 as shown in solid lines in FIG. 1. Welding assembly 190 includes a suitable weld drive 192 having a weld guide 194 and a weld tip 195 (FIG. 4).

In operaton, a tank course C1 is placed on the conveyor 36 and moved longitudinally in FIG. 1 into position with its trailing edge in line with the center of center ring 14. A second course C2 is then placed on the conveyor 36 and moved longitudinally to abut the first C1. The abutting courses are then raised above conveyor 36 by means of bottom jacks 122, 142 and 162. Mechanical jacks 140 are actuated to round and clamp the courses C1 and C2 together.

The side ring hydraulic jacks 120 and 160 are then actuated. Tank engagement members 131 may rotate during tank clamping, particularly if scalene cone courses are being clamped because the diameter of these courses is different at the three clamping positions. The jacks 120 and 160 firmly secure the courses C1 and C2 to prevent axial movement of the weld joint during rotation of the cage. The welding boom 182, including welding assembly 190, is then moved longitudinally into the course C2. Rotation of cage 17 is then begun. The welding operation of the course C1 and C2 is carried out through weld tip 195 with welding flux supplied by conduit 194. Flux back-up in telescoping trough 202 is provided from flux back-up supply assembly 220. As described above, after the combined courses C1 and C2 are welded together they are lowered and then moved longitudinally from left to right. Note in FIG. 2 that conveyor 36 extends beyond ring 16 to support tank sections previously formed. Additional courses may then be welded to the tank sections already formed according to the technique just described.

It is to be emphasized that the flux back-up assembly of the present invention may be utilized with internal circumferential welding equipment other than the three ring cage assembly described above. Particularly if the courses to be used to form a given tank are all of the same diameter, the side rings 12 and 16 may be eliminated and the courses to be welded together may be supported longitudinally of the weld point with rollers which allow the abutting courses to rotate during internal circumferential welding. Examples include the arrangement described in U.S. Pat. No. 3,888,103 and the arrangement described in the April 1969 issue of Welding and Metal Fabrication entitled New Equipment for Assembly of Tanks.

Other uses of the flux back-up assembly of the present invention in other welding arrangement will be apparent to those skilled in the art.

What is claimed is:

1. A flux back-up assembly for use in circumferential welding of abutting ends of tank courses comprising:
   a hollow ring having a plurality of circumferentially spaced enclosed hoppers mounted thereon; jack means mounted on said ring and extendible radially relative to said ring to support and clamp the abutting ends of a pair of tank courses;
   a flux back-up trough mounted upon the extendible ends of said jacks; conduit means connecting said hoppers with said flux trough, means for welding adjacent tank courses movable to a position at the lower portion of the internal periphery of said ring; and means for rotating said ring during welding, whereby as said ring rotates said hoppers and conduit means supply flux continuously to said flux back-up trough during the welding operation.

2. A flux back-up assembly according to claim 1 wherein said flux back-up trough comprises a plurality of male trough members which telescope within female trough members to vary the diameter of said flux back-up trough.

3. A flux back-up assembly according to claim 2 wherein said flux back-up trough is mounted within a plurality of radially movable shoes mounted upon said jack means.

4. A flux back-up assembly according to claim 3 wherein said hopper include at least one converging side wall which converges to define a discharge opening in the bottom of the hopper and wherein said conduit means is connected to said discharge opening.

5. A flux back-up assembly according to claim 4 wherein said hoppers include a hinged cover.

6. A flux back-up assembly according to claim 3 wherein said jacks means include mechanical jacks and wherein said shoes are mounted on said mechanical jacks.

7. A flux back-up assembly according to claim 6 wherein said female trough members are supported by said mechanical jacks and wherein said male trough members extend between adjacent mechanical jacks.

8. A flux back-up assembly according to claim 7 wherein said mechanical jacks include a ram and a sleeve and wherein said ram and sleeve each include a plurality of slots and wherein the range diameters of said flux trough can be varied by placement of pins in the respective slots in said ram and in said sleeve.

9. A flux back-up assembly for use in internal circumferential welding of abutting hollow tank courses comprising: a hollow ring having a plurality of enclosed hoppers mounted about the internal periphery of said ring; jack means mounted within said ring for radial movement relative to said ring; a flux back-up trough mounted upon the inner portions of said jacks; said flux back-up trough including a plurality of male trough members which telescope within female trough members to vary the diameter of said flux trough as said jacks move radially inwardly in said ring; conduit means connecting said hoppers with said flux trough; means for welding adjacent tank courses at a weld point in the lower portion of the internal periphery of said ring; and means for rotating said ring during a welding, whereby as said ring rotates said hoppers and conduit means supply flux continuously to said flux back-up trough during the welding operation and wherein said hoppers pass below said weld point and flux returns to said hoppers when the hoppers are below the weld point.

10. A flux back-up assembly according to claim 9 wherein said flux back-up trough includes a plurality of extensions extending at least partly longitudinally in said ring and wherein said conduit means engage said extensions to transmit flux to and from said flux trough.

* * * * *

UNITED STATES PATENT AND TRADEMARK OFFICE
CERTIFICATE OF CORRECTION

PATENT NO. : 4,025,034
DATED : May 24, 1977
INVENTOR(S) : Robert W. Randolph et. al.

It is certified that error appears in the above-identified patent and that said Letters Patent are hereby corrected as shown below:

Column 1, line 44, "through" should read -- trough --.

Signed and Sealed this sixteenth Day of August 1977

[SEAL]

Attest:

RUTH C. MASON
Attesting Officer

C. MARSHALL DANN
Commissioner of Patents and Trademarks